United States Patent [19]

Seki

[11] 4,375,910

[45] Mar. 8, 1983

[54] OPTICAL ISOLATOR

[75] Inventor: Masafumi Seki, Tokyo, Japan

[73] Assignee: Nippon Electric Co., Ltd., Tokyo, Japan

[21] Appl. No.: 190,805

[22] Filed: Sep. 25, 1980

[30] Foreign Application Priority Data

Sep. 25, 1979 [JP] Japan .......................... 54-132419[U]

[51] Int. Cl.³ .............................................. G02F 1/09
[52] U.S. Cl. .................................... 350/375; 350/377; 350/403
[58] Field of Search ............... 350/377, 375, 403, 401, 350/96.13, 96.14, 96.18

[56] References Cited

U.S. PATENT DOCUMENTS 4,178,073 12/1979 Uchida et al. ....................... 350/375
4,239,329 12/1980 Matsumoto ....................... 350/96.18

FOREIGN PATENT DOCUMENTS 54-103062 8/1979 Japan ................................ 350/96.13
55-89815 7/1980 Japan ................................... 350/377

Primary Examiner—William H. Punter
Attorney, Agent, or Firm—Hopgood, Calimafde, Kalil, Blaustein & Judlowe

[57] ABSTRACT

An optical isolator of reduced insertion loss and fabrication cost which comprises a nonreciprocal optically active element, such as a Faraday rotator, for 45° rotation of polarization, a pair of lenses arranged on the opposite sides of the optically active element and a pair of birefringent crystal plates on the outer sides of the respective lenses having their "principal planes" displaced 45° from each other. The light beam passing through the isolator is most constricted at its opposite ends where the birefringent crystal plates are arranged and this minimizes the amount of offset required between any reflected light and the incident light at the entrance end of the isolator to prevent the reflected light from returning to the light source such as a semiconductor laser, thus enabling substantial reduction in thickness of the birefringent crystal plates. The use of two lens elements is effective to reduce the coupling loss of the isolator.

3 Claims, 1 Drawing Figure

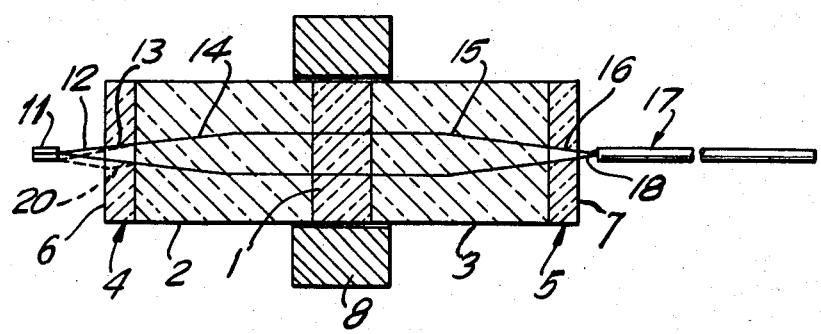

OPTICAL ISOLATOR

BACKGROUND OF THE INVENTION

1. Field of the Invention

This invention relates to isolators usable in the optical wavelength region and more particularly to optical isolators suitable for optical fiber communications and the like.

2 Description of the Prior Art

Recently, as research and development in the field of optical fiber communications advance, the communication technique is finding increasing practical application and, with improvements made in performance, including reduction in insertion loss, of various optical devices used in optical fiber communications, such as optical fibers and coupling circuits between a light source and optical fibers, a number of problems have been given rise to as described below: First, owing to the fact that the light reflected as at the end face of an optical device is allowed to return to the light source without any substantial loss, the operating characteristic of the light source is adversely affected particularly in cases where the light source takes the form of a semiconductor or other laser oscillator and, in some cases, there arises the problem of communication quality being deteriorated to an extreme extent. Another problem recently arising is that of multiple reflection between the end faces of optical devices that results in appearance of echoes in the signal being transmitted.

One of the measures taken to solve these problems is the use of an optical isolator that utilizes the Faraday effect obtainable in a material subjected to a magnetic field. The basic structure of such optical isolator includes a Faraday rotator effective to rotate the plane of polarization of the incident light beam by approximately 45 degrees and a pair of polarizers, i.e., optical elements serving the function of extracting the linearly polarized component from the light passing through the elements, which are arranged on the opposite sides of the Faraday rotator with their azimuthal angles making 45 degrees relative to each other. Such optical isolators usable in the 0.8 $\mu$m region and those usable in the 1.3 $\mu$m region have been proposed in the article entitled "Optical Isolators for Optical Fiber Communications" (in Japanese), by Seki, Kobayashi and Ueki, Technical Reports OQE 78-133 of the Institute of Electronics and Communication Engineers of Japan. According to this proposal, polarizers in the form of Rockon prisms are employed and only limited reduction in cost is obtainable since generally fabrication of polarizing prisms such as Rockon prisms inevitably includes the step of cementing together the prism elements previously precisely polished, and which makes any substantial reduction in fabrication cost of such prisms considerably difficult.

Accordingly, it is highly desirable from the standpoint of cost reduction to construct an optical isolator without use of any components necessitating the precise polishing process such as polarizing prisms. The simplest method suited to this end is to employ calcite or other birefringent crystal plates as polarizing elements, as proposed in the Japanese Patent Public Disclosure Number 53-149046 entitled "Optical Isolator," which corresponds to the U.S. Pat. No. 4,178,073. The optical isolator proposed therein includes a first rod lens in the form of a light-focusing transmission body of a quarter pitch length in the direction of light travel, a first birefringent crystal plate of calcite, a Faraday rotator effective to rotate the plane of polarization by 45 degrees, an optically active crystal element of quartz for 45° rotation of polarization, a second birefringent crystal plate of calcite, and a second rod lens, all arranged in that order. With this optical isolator, the incident light beam, emerging from a first optical fiber arranged on the entrance side of the isolator, is coupled to a second optical fiber on the exit side thereof without any substantial loss, and any light beam returning from the second optical fiber, leaves the first birefringent crystal plate, following therein a path distinct from that of the incident light beam on account of the nonreciprocality of the Faraday rotator. Superimposition on the incident light of the reflected light at the entrance end of the optical isolator is prevented by arranging so that the reflected light leaves the first birefringent crystal plate at such a point thereon as to enable it to proceed clear of the first rod lens or by arranging a light stop in an appropriate position to intercept that portion of the reflected light which may otherwise enter the first rod lens.

Such structure does not involve any particular problem as far as the functioning of the device is concerned but the two birefringent crystal plates employed therein are required to have a considerable length in order to ensure that the reflected light does not strike on any portion of the cross section of the first rod lens or to ensure that only a limited portion of the reflected light is allowed to enter the first rod lens. For example, where the rod lens has a diameter of 2 mm, the birefringent crystal plate should have a length of about 20 mm, in order to enable the reflected light to pass completely clear of the rod lens. This makes it impossible to reduce the cost of such isolator elements to any satisfactory extent.

Further, in certain optical isolators, only a single conventional spherical lens has been employed to enable reduction in length of the birefringent crystal plates. In this case, however, the distance between the conventional spherical lens and the laser oscillator or the adjacent optical fiber must necessarily be increased, making it difficult to reduce the insertion loss of the optical isolator for improved coupling efficiency.

SUMMARY OF THE INVENTION

Under these circumstances, the present invention has for its object the provision of an optical isolator which is substantially reduced in insertion loss and in cost of fabrication.

To attain this object, the present invention proposes to arrange a pair of lens elements on the opposite sides of a nonreciprocal optically active element such as a Faraday rotator with a pair of birefringent crystal plates arranged on the outer sides of the respective lens elements.

According to the present invention, there is provided an optical isolator which comprises a nonreciprocal optically active element effective to rotate the plane of polarization of a linearly polarized light beam passing therethrough by approximately 45 degrees, a pair of lens elements arranged on the opposite sides of the nonreciprocal optically active element along the optical axis thereof, and a pair of birefringent crystal plates arranged on the opposite ends of the light path formed of the nonreciprocal optically active element and the two lens elements and each having its optic axis inclined to the direction of light travel in the optical isolator.

According to the present invention, the coupling loss of the optical isolator is effectively reduced owing to the use of two lens elements and the amount of offset or deviation from the incident light beam required of the reflected light beam as leaving the first birefringent crystal plate is substantially reduced inasmuch as the birefringent crystal plates are arranged at locations where the light beam is most constructed, and which enables substantial reduction in length of the crystal plates as measured in the direction of light travel.

The above and other objects, features and advantages of the present invention will become apparent from the following description, taken in conjunction with the accompanying drawing.

BRIEF DESCRIPTION OF THE DRAWING

In the drawing, the single FIGURE is a schematic longitudinal cross section of an optical isolator embodying the principles of the present invention.

DESCRIPTION OF THE PREFERRED EMBODIMENT

Referring to the drawing, the optical isolator illustrated therein includes a Faraday rotator 1 in the form of a YIG (yttrium-iron-garnet) crystal having a thickness of approximately 2 mm. A first rod lens 2 and a second rod lens 3 are fixedly secured to the Faraday rotator 1 on the opposite sides thereof by optical adhesive means. These rod lenses are each a light-focusing transmission body having a focusing parameter of 0.16 $mm^{-2}$. As used herein, the term "light-focusing transmission body" means a medium of transparent substance the refractive index of which decreases, in the cross section normal to the central axis, in direct proportion to the square of the distance from the central axis and which is commercially available under the trade name "Selfoc lens" from the Nippon Sheet Glass Co., Ltd., Osaka, Japan. The rod lenses 2 and 3 are of 0.16-pitch length and 0.17-pitch length, respectively. Incidentally, a unit pitch length represents the length of distance over which light passing through the light-focusing transmission body in an undulatory fashion travels in each cycle of undulation.

Secured to the outer end faces of the respective rod lenses 2 and 3 by optical adhesive means are a pair of first and second birefringent crystal plates 4 and 5 which are each so cut that the normal to thereto is at an angle of approximately 48 degrees to the optic axis of the birefringent crystal. In this instance, the two crystal plates are each in the form of a thin sheet of calcite 1 mm thickness, having its opposite surfaces optically polished. The first and second birefringent crystal plates 4 and 5 are fixed in angular position relative to each other so that the principal plane of one of the two crystal plate, that is, the plane containing the normal thereto and the optic axis of the crystal, lies at an angle of approximately 45 degrees of the principal plane of the other crystal plate. As illustrated in the drawing, the principal plane of the first birefringent crystal plate 4 lies on the drawings sheet while that of the second birefringent crystal plate 5 is inclined at an angle of 45 degrees to the sheet. For the light employed (having a wavelength of 1.3 μm or thereabout), antireflection coatings are applied to the respective outer surfaces 6 and 7 of first and second birefringent crystal plates 4 and 5. An annular form of rare earth magnet 8 is arranged in encircling relation to the Faraday rotator 1 to form a magnetic field sufficient to produce saturation magnetization of the Faraday rotator 1. With this arrangement, it is to be noted that light of a wavelength in the vicinity of 1.3 μm, passing through the Faraday rotator 1, undergoes a Faraday rotation of approximately 45 degrees.

Reference numeral 11 designates a semiconductor laser of the InGaAsP (indium-gallium-arsenic-phosphorus) quarternary crystal type, arranged with its plane of p-n junction held normal, as illustrated, to the drawing sheet. Description will next be made of the operation of the optical isolator, providing that the light beam 12 emerging from the semiconductor laser 11 falls on the first birefringent crystal plate 4 at right angles thereto. It is to be understood that the optic axis of the first birefringent crystal plate 4 lies in the plane of the drawing sheet.

The light beam 12 emitted by the semiconductor laser 11 includes a heavily polarized component (TE-mode light in the interior of semiconductor laser), which is a polarized light normal to the drawing sheet. The light 12 issuing from semiconductor laser 11 acts as an ordinary ray in the first birefringent crystal plate 4 since the principal plane of the latter lies on the drawing sheet and, passing through the crystal plate 4 in the same manner as through an isotropic glass sheet, enters as a first polarized light 13 into the first rod lens 2 to be converted into a parallel light beam 14, which proceeds into the Faraday rotator 1. The parallel light beam 14, emerging from the Faraday rotator 1 with its plane of polarization rotated by 45 degrees, enters the second rod lens 3 to form a converging light 15, which proceeds into the second birefringent crystal plate 5. Since the principal plane of the second birefringent crystal plate 5, which contains the normal thereto and the optic arix of the birefringent crystal, is in an angular position displaced relative to that of the first birefringent crystal plate 4 by the angle of Faraday rotation of 45 degrees, the converging light 15 proceeds through the second birefringent crystal plate 5 as a second polarized beam 16 of ordinary ray and is focused at a point outside of the second birefringent crystal plate 5. In this manner, the light from the semiconductor laser 11 can be efficiently coupled to an optical fiber 17 inasmuch as the adjacent end face 18 of the latter is placed at the focal point.

In the optical path structure described above, the lengths of the components other than the rod lenses, lying between the semiconductor laser 11 and optical fiber 17, are reduced as much as possible and are arranged so that the light beam passes through the central region of each of the rod lenses, remaining practically free from any aberration effect of the peripheral regions of the rod lenses. On account of this, the coupling loss between the semiconductor laser 11 and optical fiber 17 can be effectively held to a minimum.

Description will next be made in connection with the backward travel of that portion of second polarized light beam 16 which is reflected at the entrance end face 18 of optical fiber 17 or at the exit end face 19 thereof. Of such reflected light, that component which is of the same polarization as the second polarized light beam 16 proceeds backwardly along quite the same path previously followed by the second polarized light bean 16, converging light beam 15 and parallel light beam 14 to reach the exist end of the first birefringent crystal plate 4. It is to be noted that the reflected light component has its plane of polarization displaced 90 degrees relative to that of parallel light beam 14 before its entering the first birefringent crystal plate 4 because of the nonreciprocal optical activity of Faraday rotator 1. In the first birefringent crystal plate 4, therefore, the light travelling backward takes the form of a third polarized light beam 20 of extraordinary ray as distinct from the first polarized light beam 13 of ordinary ray and leaves the first birefringent crystal plate 4, following a path indicated in the drawing by the dotted lines, to focus at a point apart from the light-emitting portion of semiconductor laser 11. On the other hand, that polarized component of the reflected light which has its plane of polarization displaced 90 degrees from that of the second polarized light beam 16 follows in the second birefringent crystal plate 5 a path distinct from that followed by the second polarized light beam 16 and again never returns to strike the light-emitting portion of semiconductor laser 11.

As will be readily appreciated from the foregoing description, the embodiment illustrated functions as an optical isolator which involves only an extremely limited loss in light travelling forwardly therethrough and in which any light reflected to travel backwardly follows a path distinct from that of fowardly travelling light particularly at the entrance end of the optical isolator. Further, in such optical isolator, since the reflected light is only required to be offset by quite a small amount just enough to clear the light-emitting portion of semiconductor laser 11, the birefringent crystal plates can safely be made 1 mm or less thick, thus contributing to substantial reduction in cost of the optical isolator.

Numerous alterations of the structure disclosed above will suggest themselves to those skilled in the art. First, the thickness of the first and second birefringent crystal plates 4 and 5 is not limited to 1 mm but may further be reduced, for example, to 0.5 mm, as long as the amount of light returning to the light emitting portion of semiconductor laser 11 is held below a predetermined level for suppression of any unstable oscillation. Further, any appropriate antireflection coatings may be formed on the surfaces of the Faraday rotator 1 for the optical adhesive agent used thereon in order to minimize the amount of light reflected at the boundary surfaces to proceed backwardly. Further, use may be made of lenses of the conventional spherical-surface type in place of the first and second rod lenses 2 and 3. The first and second birefringent crystal plates 4 and 5 may also be made of any birefringent crystal material other than calcite. Moreover, though in the embodiment described herein a semiconductor laser is employed as a light source that produces substantially perfect polarized light, any ordinary light source may be employed instead, the light therefrom being supplied through an appropriate optical fiber. On this occasion, however, it is necessary to insert an optically active crystal for 45° rotation between the Faraday rotator 1 and the second birefringent crystal plate 5. The amount of offset required between the reflected light and the light emerging from the optical fiber is at most of the order of the size of core radius of the optical fiber.

What is claimed is:

1. An optical isolator comprising: a nonreciprocal polarization rotation element effective to rotate the plane of polarization of linearly-polarized collimated light beam approximately 45 degrees as the latter passes through said polarization rotation element in one direction; a pair of lens elements arranged on the opposite sides of said polarization rotation element so that said lens elements and said nonreciprocal polarization element are on a common optical path; and a pair of birefringent crystal plates effective to split a light beam incident thereon into two orthogonally polarized components and arranged on said common path and on the outer sides of said respective lens elements with the principal planes, each containing the normal to the associated birefringent crystal plate and the optic axis thereof, displaced approximately 45 degrees from each other.

2. An optical isolator as set forth in claim 1, in which said nonreciprocal polarization rotation element is a Faraday rotator.

3. An optical isolator as set forth in claim 2, in which said lens elements are each a rod light focusing transmission body with the refractive index, in the cross section normal to a central axis, gradually decreasing in proportion to the square of the distance from the central axis.

* * * * *